United States Patent [19]

Brown et al.

[11] 3,904,803

[45] Sept. 9, 1975

[54] TRANSFER ELEMENTS AND PROCESS

[75] Inventors: Albert E. Brown; Allan T. Schlotzhauer; Douglas A. Newman, all of Glen Cove, N.Y.

[73] Assignee: Columbia Ribbon and Carbon Manufacturing Co., Inc., Glen Cove, N.Y.

[22] Filed: Oct. 31, 1974

[21] Appl. No.: 519,400

[52] U.S. Cl. ............... 428/320; 427/152; 427/153; 428/914
[51] Int. Cl.² .... B41C 1/06; B41M 5/02; B32B 3/00
[58] Field of Search....... 117/36.1, 36.4, 76 F, 76 P; 161/159, 160, 406

[56] References Cited
UNITED STATES PATENTS 3,314,814 4/1967 Newman............................ 117/36.1
3,689,301 9/1972 Scott................................. 117/36.4

Primary Examiner—William J. Van Balen
Attorney, Agent, or Firm—Thomas L. Tully; Arthur A. Johnson

[57] ABSTRACT

Pressure-sensitive reusable transfer elements of the squeeze-out type having a microporous resinous ink-releasing layer firmly bonded to a flexible foundation. The invention is characterized by the use of a bonding layer which is applied to the foundation as an aqueous composition comprising a mixture of two water-dispersible resinous binder materials, one of which is water-soluble and does not insolubilize on drying and the other of which is insoluble in water in that it forms a water-insoluble film on drying.

10 Claims, No Drawings

TRANSFER ELEMENTS AND PROCESS

Reusable transfer elements of the squeeze-out type are well known in the carbon paper and ribbon field. Such transfer elements have a microporous skeletal resinous structure which is substantially non-transferable under the effects of imaging pressure but which contains an oily ink within the pores thereof which is transferable under such pressure. If the microporous resinous structure is not adequately bonded to its foundation, it will break down and fracture and transfer to the copy sheet in a spotty fashion so that the transfer element is no longer reusable to produce good uniform copy.

It is known according to U.S. Pat. No. 3,037,879 to provide a resinous bonding layer between a flexible foundation and a microporous reusable transfer layer, the latter being solvent-bonded to the bonding layer to prevent transfer of the microporous resinous structure during use. This is accomplished by applying the resinous ink layer using a volatile organic solvent which is a solvent for the resin of the bonding layer and dissolves the surface of the latter to permit integration with the microporous resinous structure of the ink layer.

It is known according to U.S. Pat. No. 3,314,814 to produce microporous resinous squeeze-out type ink layers from aqueous solvent systems using film-forming materials such as polyvinyl alcohol which are soluble in water or mixtures of water and alcohol. Aqueous compositions tend to be repelled by resin surfaces such as plastic films and resin coated films and papers but the inclusion of aliphatic alcohol solvent improves the affinity of aqueous compositions for such surfaces. However the resulting bond is not as strong as a solvent bond and such transfer elements are not as resistant to breakdown on repeated reuse as desirable. Attempts to overcome this problem by the use of a bonding layer based upon a water-soluble binder material such as polyvinyl alcohol or a water-emulsifiable binder material such as polyvinyl acetate latex have not been successful. A polyvinyl alcohol bonding layer causes the flexible foundation, whether paper or plastic film, to curl and roll badly so that the resulting transfer elements are commercially unacceptable. A polyvinyl acetate bonding layer insolubilizes during drying and does not permit solvent-bonding to occur with the ink layer composition.

It is the principal object of the present invention to provide a resinous bonding layer which is capable of being applied to a flexible foundation by means of an aqueous solvent without causing objectionable curling and which provides a strong bond with a microporous resinous ink layer, particularly such as ink layer applied by means of an aqueous solvent.

It is another object of this invention to provide a water-base composition which can be applied to a flexible foundation, particularly paper, to provide a bonding layer which has excellent bonding properties for microporous ink layers applied either from water or from organic solvent vehicles.

These and other objects and advantages of the present invention will be apparent to those skilled in the art in the light of the present disclosure.

The present invention is based upon a series of discoveries, one being that the addition of a substantial amount by weight of a water-insoluble, water-dispersible resinous material, such as polyvinyl acetate or acrylic polymer, to a water-soluble resinous material, such as polyvinyl alcohol or polyethylene oxide, provides an aqueous composition which can be coated onto a flexible foundation and dried by evaporation of the water without producing objectionable curl of the foundation. Second is the discovery that such coatings have excellent bonding properties with respect to water-applied microporous ink layers, apparently due to a softening of the water-soluble resinous material which permits solvent-bonding to occur. Third is the discovery that such coatings also have excellent bonding properties with respect to organic solvent-applied microporous ink layers, apparently due to the solubility of the water-insoluble binder material in organic solvents, particularly aliphatic solvents including ketones such as methyl ethyl ketone and esters such as ethyl acetate.

We have found that aqueous compositions comprising from about 20 to 60 parts by weight of a water-soluble film-forming binder material and from about 80 to 40 parts by weight of a water-insoluble, water-dispersible synthetic resinous binder material, and having a solids content of from about 20 to 40%, produce excellent results from the standpoint of curl-resistance and bonding strength whether applied to paper or plastic film. The phrase "water-soluble resinous material" is used to identify resinous materials which are not only soluble in water but which produce water-soluble films when deposited from aqueous solvent and dried. The phrase "water-insoluble resinous material" is used to identify resinous materials which are dispersible in water as solutions, emulsions or colloids but which produce water-insoluble films when deposited from water and dried.

The preferred water-soluble film-forming materials are polyethylene oxide and polyvinyl alcohol but other materials are also suitable including polyvinyl pyrrolidone, methyl cellulose, ethyl hydroxyethyl cellulose, oxidized starch, casein, and the like.

The preferred water-insoluble resinous materials are polyvinyl acetate latices and acrylic polymer dispersions but other water-dispersible materials are also suitable including polyvinylidene chloride latices, polystyrene, butadiene-styrene copolymer latices, and the like. Some of these materials, particularly some of the acrylic polymer dispersions, are identified by their manufacturers are aqueous solutions, are slightly milky in color and dry as substantially clear coatings. However they produce water-insoluble coatings on drying and thus are included herein and within the appended claims as being water-insoluble materials. Water-dispersible acrylic polymers include polymers of ethyl acrylate, methyl methacrylate, acrylamide, acrylonitrile, acrylic acid and copolymers thereof with each other. The phrase "water-dispersible" is used generically to include water-soluble materials and water-insoluble materials capable of stable suspension in an aqueous vehicle for prolonged periods of time.

In addition to the mixed binder material, the undercoating preferably includes a small amount, up to about 5% by weight of the total solids, of a conventional emulsifying or wetting agent such as an anionic material, and a small amount by weight of a pigment or dye to color the composition so that the presence and uniformity of the dried undercoating on the flexible foundation is visually detectable.

The following examples of suitable undercoating compositions are given as illustrative and should not be considered limitative.

Example 1

| Ingredients | Parts by Weight |
| --- | --- |
| Polyvinyl alcohol | 10.0 |
| Polyvinyl acetate | 10.0 |
| Anionic emulsifying agent | 0.001 |
| Water | 40.0 |

The polyvinyl alcohol preferably is incorporated in the form of an 8.0% aqueous solution commercially available under the trademark Elvanol 71–30 and is a 98% hydrolyzed polyvinyl acetate. The polyvinyl acetate preferably is incorporated in the form of a 55% aqueous emulsion commercially available under the trademark Vinac. The ingredients are uniformly mixed and applied to a thin flexible paper foundation as a uniform continuous coating having a weight of from about ½ to 3 pounds per ream (3300 square feet) and dried by evaporation of the water.

| Ingredients | Parts by Weight |
| --- | --- |
| Polyethylene oxide | 12.0 |
| Acrylic polymer | 8.0 |
| Anionic emulsifying agent | 0.001 |
| Water | 35.0 |

The polyethylene oxide comprises a 10% aqueous solution commercially available under the trademark Polyox. The acrylic polymer comprises a 35% aqueous solution of acrylic polymers and polyethylene wax commercially available under the trademark Versacryl 763 which dries to a water-insoluble film. The ingredients are mixed and applied to a 0.5 mil polyethylene terephthalate plastic film and dried in the manner discussed in Example 1.

The present undercoating compositions provide curl-resistant coatings having excellent bonding properties with respect to paper and plastic film foundations and also with respect to resinous squeeze-out type ink layers applied from either water or volatile organic solvent vehicles. The undercoating can conveniently be applied to paper foundations at the paper mill during manufacture of the paper. Suitable plastic film foundations include polyethylene terephthalate, polypropylene, chlorinated rubber, cellulose acetate, and the like.

Suitable water-base compositions for applying the resinous squeeze-out ink layer over the present bonding layers of the present invention are those set forth in U.S. Pat. No. 3,314,814, particularly those comprising polyvinyl alcohol as the resinous binder material, incompatible oil and coloring matter. Suitable organic solvent-base compositions include those set forth in U.S. Pat. Nos. 3,037,879 and 3,467,539, particularly those comprising copolymers of vinyl chloride and vinyl acetate as the resinous binder material, incompatible oil and coloring matter, and methyl ethyl ketone and/or ethyl acetate as the organic solvent.

The present undercoats or bonding layers function well with ink compositions applied from either water or organic solvents apparently because they are both receptive to such liquids and resistant to excessive dissolution thereby. In the case of aqueous ink compositions, the water-soluble binder of the undercoating is softened and/or dissolved at the surface of the bonding layer by the aqueous vehicle while the water-insoluble binder of the undercoating is water-resistant and prevents the undercoating from being softened or dissolved excessively. Excessive softening or dissolution can cause removal of the undercoating from portions of the foundation, and excessive deposits of the undercoating in other areas of the foundation, with resultant uneven performance by the transfer element. As it is difficult to completely remove solvent which has penetrated into the undercoating after the ink layer has been applied thereover, and a soluble undercoating will absorb more solvent than an insoluble undercoating containing only a portion of soluble material.

In the case of organic solvent-applied ink compositions, the undercoating or barrier layer has a strong affinity therefor due to the solubility or softenability of the water-insoluble binder in a number of organic solvents including lower aliphatic ketones and lower aliphatic esters, each having from 1 to 4 carbon atoms in the aliphatic radical.

In each of the above instances, the reusable ink layer becomes solvent-bonded to the bonding layer whereby the microporous structure of the film-forming binder material of the ink layer solvent-integrates with the dissolved portions of the surface of the bonding layer and dries as a non-pressure-transferable porous sponge containing within the pores thereof the incompatible oil and coloring matter as a pressure-exudable ink.

Variations and modifications may be made within the scope of the claims and portions of the improvements may be used without others.

We claim:

1. Pressure-sensitive reusable transfer element comprising a flexible foundation, a bonding layer on said foundation and a volatile vehicle-applied microporous resinous ink layer adhered to said bonding layer, characterized by said bonding layer comprising a mixture of from about 20 to 60 parts by weight of a water-soluble film-forming binder material and from about 80 to 40 parts by weight of a water-insoluble, water-dispersible film-forming binder material.

2. Transfer element according to claim 1 in which said volatile vehicle-applied ink layer comprises a water-applied composition comprising polyvinyl alcohol as the resinous binder material.

3. Transfer element according to claim 1 in which said volatile vehicle-applied ink layer comprises a volatile organic solvent-applied composition comprising a vinyl chloride-vinyl acetate polymer as the resinous binder material and a lower aliphatic solvent as the organic solvent.

4. Transfer element according to claim 1 in which said water-soluble film-forming binder material is selected from the group consisting of polyethylene oxide, polyvinyl alcohol, polyvinyl pyrrolidone, methyl cellulose, ethyl hydroxyethyl cellulose, oxidized starch and casein.

5. Transfer element according to claim 1 in which said water-insoluble film-forming binder material is selected from the group consisting of polyvinyl acetate, acrylic polymers, polyvinylidene chloride, polystyrene and butadiene-styrene copolymers.

6. Transfer element according to claim 1 in which said foundation comprises paper.

7. Process for producing pressure-sensitive reusable transfer elements which comprises the steps of:
  a. coating a flexible foundation with a continuous uniform layer of an aqueous composition comprising from about 20 to 60 parts by weight of a water-soluble film-forming binder material and from about 80 to 40 parts by weight of a water-dispersible, water-insoluble film-forming binder material;
  b. drying said layer by evaporation of the water to form a thin bonding layer on said foundation;
  c. coating the surface of said bonding layer with a continuous uniform layer of ink coating composition comprising a film-forming binder material, an incompatible oil, coloring matter and a volatile vehicle which is at least a partial solvent for either said water-soluble binder material or said water-insoluble binder material of said bonding layer; and
  d. drying said ink coating by evaporation of said volatile vehicle to form a microporous structure of said film-forming binder material solvent-bonded to said bonding layer and containing within the pores thereof said incompatible oil and coloring matter as a pressure-exudable ink.

8. Process according to claim 7 in which the volatile vehicle of the ink coating composition comprises water which is a solvent for the water-soluble binder material of the bonding layer.

9. Process according to claim 7 in which the volatile vehicle of the ink coating composition comprises a lower aliphatic solvent which is a solvent for the water-insoluble binder material of the bonding layer.

10. Process according to claim 9 in which the lower aliphatic solvent is selected from the group consisting of lower aliphatic ketones and lower aliphatic esters.

* * * * *

UNITED STATES PATENT OFFICE
CERTIFICATE OF CORRECTION

PATENT NO. : 3,904,803

DATED : September 9, 1975

INVENTOR(S) : Albert E. Brown, Allan T. Schlotzhauer and Douglas A. Newman

It is certified that error appears in the above-identified patent and that said Letters Patent are hereby corrected as shown below:

Column 1, line 54, "as" should read -- an --; column 2, line 48, "are" (first occurrence) should read -- as --; column 3, line 26, "Example 2" omitted; column 4, line 3, "sotened" should read -- softened --; line 11, "As" should read -- Also --; line 52, "polymer" should read -- copolymer --.

Signed and Sealed this second Day of December 1975

[SEAL]

Attest:

RUTH C. MASON
Attesting Officer

C. MARSHALL DANN
Commissioner of Patents and Trademarks